United States Patent
Harneit

(10) Patent No.: US 6,520,481 B2
(45) Date of Patent: Feb. 18, 2003

(54) LINEARLY REGULATED GAS VALVE FOR GAS BURNERS

(76) Inventor: Uwe Harneit, 1466 W. Francis Ave., Ontario, CA (US) 91762-6016

( * ) Notice: Subject to any disclaimer, the term of this patent is extended or adjusted under 35 U.S.C. 154(b) by 64 days.

(21) Appl. No.: 09/895,733

(22) Filed: Jul. 2, 2001

(65) Prior Publication Data

US 2002/0033464 A1 Mar. 21, 2002

Related U.S. Application Data

(60) Provisional application No. 60/232,871, filed on Sep. 15, 2002.

(51) Int. Cl.[7] ............................................. F16K 5/16
(52) U.S. Cl. ..................... 251/207; 251/209; 251/183; 251/310; 137/599.17
(58) Field of Search ................... 251/181, 183, 251/207, 209, 310; 137/599.17

(56) References Cited

U.S. PATENT DOCUMENTS

| | | | | |
|---|---|---|---|---|
| 2,137,406 A | * | 11/1938 | Johnson | 251/183 X |
| 2,763,289 A | * | 9/1956 | Mueller | 137/599.17 |
| 2,902,253 A | * | 9/1959 | Page | 251/209 |
| 4,102,357 A | | 7/1978 | Charlton | |
| 4,345,622 A | | 8/1982 | Henningsson | |
| 4,373,548 A | * | 2/1983 | Chou | 251/207 X |
| 4,699,358 A | | 10/1987 | Iqbal | |
| 4,862,917 A | * | 9/1989 | Genbauffe | 137/599.17 |
| 4,881,718 A | | 11/1989 | Champagne | |
| 4,947,891 A | | 8/1990 | Genbauffe | |
| 5,108,075 A | | 4/1992 | Downard et al. | |
| 5,148,839 A | * | 9/1992 | Kirwan et al. | 141/1 |
| 5,242,150 A | | 9/1993 | Shiffer et al. | |
| 5,370,154 A | | 12/1994 | Greer | |
| 5,372,158 A | * | 12/1994 | Berfield | 251/310 X |
| 5,524,863 A | | 6/1996 | Davis | |
| 5,551,467 A | | 9/1996 | Booth et al. | |
| 5,950,664 A | * | 9/1999 | Battaglia | 251/310 X |
| 6,164,328 A | * | 12/2000 | Huber, Jr. | 137/599.17 |

* cited by examiner

Primary Examiner—Henry c. Yuen
Assistant Examiner—Eric Keasel
(74) Attorney, Agent, or Firm—Lewis M Brande; Thomas A. McCleary; Brande & McCleary

(57) ABSTRACT

The current invention is a linearly regulated gas valve for a gas burner, utilizing a central plug to control the gas flow. This valve has the capability of providing a smoothly increasing or decreasing gaseous flow between the highest setting and the lowest setting, allowing the user a wide choice of settings for any particular food that is being prepared on the gas burner.

This invention also does not require an additional jet to operate at the low setting.

7 Claims, 5 Drawing Sheets

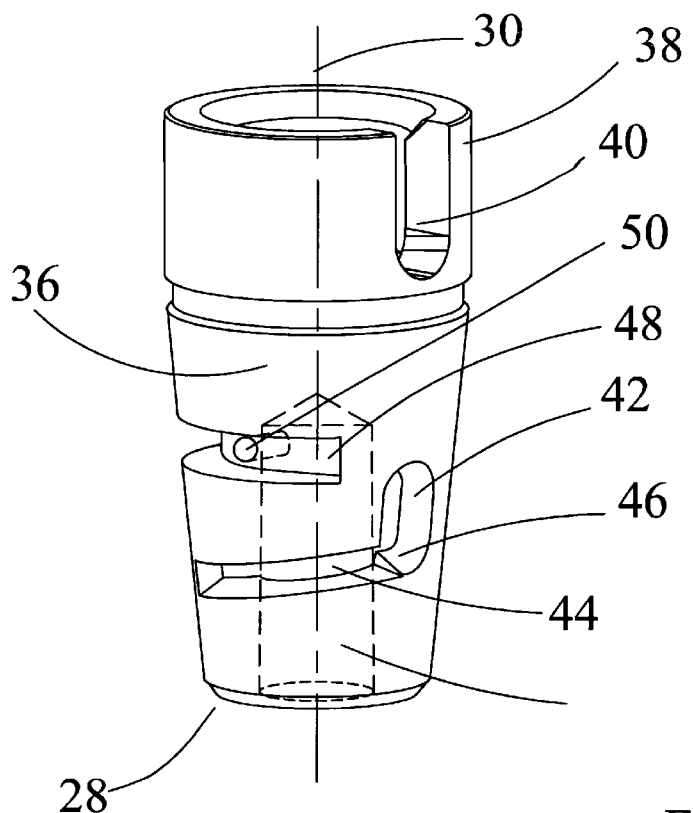
FIG. 2
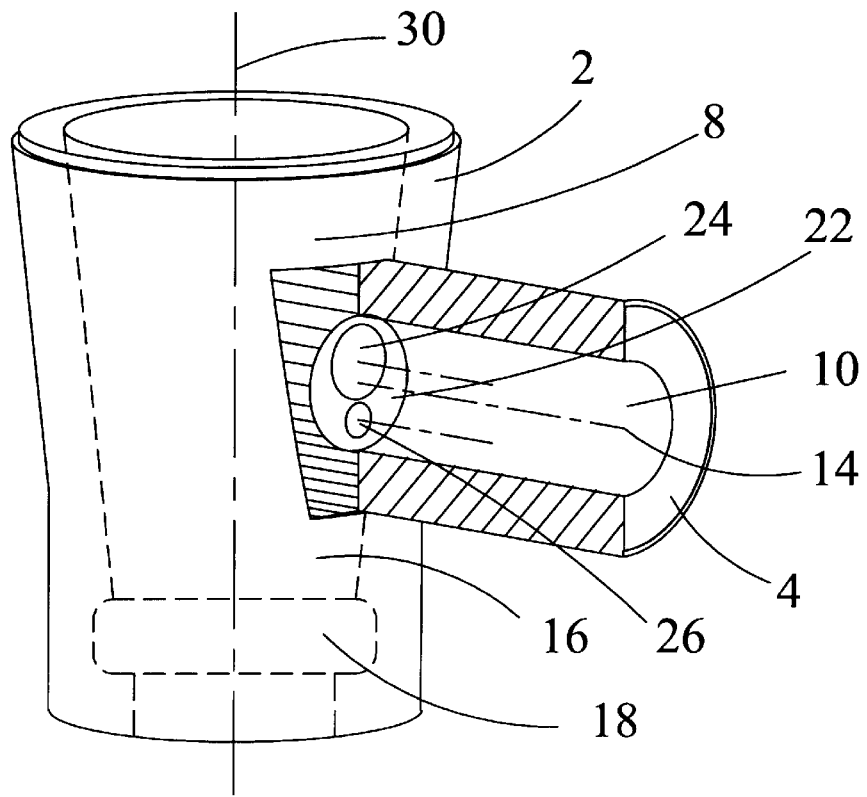

LINEARLY REGULATED GAS VALVE FOR GAS BURNERS

This application claims benefit of provisional application No. 60/232,871 filed Sep. 15, 2002.

FIELD OF THE INVENTION

The present invention relates to gas control valves used in cooking utensils similar to gas stoves and the like, that use a central plug to control the volume of gas through the control valve.

BACKGROUND OF THE INVENTION

There are a number of variations in the construction of gas valves. These valves have maximum gas flow settings, (assigned to the completely open setting of a burner) and minimum gas flow settings (assigned to the lowest level of load of the same burner), as well as an intermediate setting. Normally these gas valves have an inlet orifice that allows the in-coming gas to flow towards an outer mantle of the operating element (valve plug/gas valve plug).

The operating element, or valve plug, has a number of holes bored into it so that all the gas will discharge into a gas outlet area. When the plug is turned 90° in the valve housing, the holes in the plug overlap with the gas inlet hole in the valve gas valve body, and this allows the maximum quantity of gas to flow through the gas valve. When the valve is set for the minimum flow position of a burner; an additional hole with a specified dimension is bored into the plug so that further turning of the plug in the valve housing will orient the additional hole located in the plug, into alignment with the hole in the valve housing, at the gas inlet hole of the valve housing.

In order to provide for an intermediate gas flow setting, i.e. a gas flow between the maximum flow setting and the minimum flow settings, the plug is turned so that holes of various dimensions, which have been drilled through the plug, are positioned at the gas inlet hole of the valve housing, thereby switching the gas valve to a high, medium high, medium, medium low, or low setting. These various settings are achieved by turning a valve knob that is installed on the plug.

In order to prevent the gas flame from being extinguished during the switching process, the holes that are drilled in the plug are positioned close enough together to allow at least two of the holes drilled in the plug to overlap with the gas inlet in the valve housing. A primary disadvantage of having two holes overlap with the gas inlet is that there is a short stretch of the switching path where gas from both holes will flow through the plug at the same time.

In the current state of the art of gas valve design, there are gas valves that are capable of achieving linear regulation. These gas valves do so by having a diagonal channel machined on the outer circumference of the plug. A bypass hole is placed near a fixed gas jet in order to guarantee a low pressure setting of the valve. The gas jet has a predetermined and fixed dimension for the low setting. An additional channel directs gas back to the plug. A further additional channel directs the gas to the gas outlet of the valve. The linear regulation of the gas flow is achieved by using the diagonally located channel, which is located in the plug, and begins at the hole in the plug for the high setting. The gas flow is gradually reduced during the switching process (turning). The plug is positioned in front of the gas inlet hole in the valve housing.

This type of construction is quite expensive to produce, because of the extra jet necessary to guarantee the low position. This type of construction is also inexact, because of the valve housing's diametrical relationship to the constriction diameter required on a short switching path.

DESCRIPTION OF THE PRIOR ART

U.S. Pat. No. 5,551,467 by Booth et al., dated Sep. 3, 1996, discloses a Ball Valve with Controlled Flow Variation. This invention uses a ball that is attached to an actuator handle that can be manually or mechanically actuated. The ball has a passageway that has been specifically sized for the flow fluid. The ball has a discharge orifice having a multi-shaped cutout. This multi-shaped cutout provides for controlled variation of the fluid flow. This patent differs from the present disclosure in that the control valve has a simple circular inlet in the ball valve, while the exit is the compound shape that offers varying flow characteristics based upon the angular position of the exit in relationship to the inlet. The ball valve uses a direct inlet to exit orientation where the fluid flow makes no apparent turns but flows straight through the valve. The present disclosure contains a plug that has an inlet at the bottom of the plug and exits perpendicular to a longitudinal axis of the plug.

U.S. Pat. No. 4,699,358 by Iqbal, dated Oct. 13, 1987, discloses a Faucet Valve with Noise Reduction Structure. This patent is specific for reducing or suppressing noise when water is flowing through the valve. The sleeve member in the 358 patent has an outlet on the side of the sleeve member, which is generally oval in shape, that allows the fluid to exit. The seal support, which is mounted in the sleeve member and is capable of rotating about its axis, allows water to enter from the bottom of the seal support. The stem has an inner piston, which has an inlet port and an exit port, that allows the water to exit through the outlet in the sleeve member.

U.S. Pat. No. 4,102,357 by Charlton, dated Jul. 25, 1978, discloses Variable Flow Outlet Valves. This patent discloses a valve body assembly consisting of 2 cylindrical bodies separated by a space, wherein the space is filled with a compressed porous material. An interior tubular outlet sleeve communicates with various vents that provide specific mass flow for the air. This patent is specific for low noise air vents in aircraft cockpits and would not be adaptable to provide smooth linear flow to provide gas for appliances. The outlet valve is designed to reduce the noise inherent with air flow systems in aircraft.

U.S. Pat. No. 4,947,891 by Genbauffe, dated Aug. 14, 1990 discloses a Fuel Control Device, a Fuel Control System Using the Device and a Method of Making the Device.

SUMMARY OF THE INVENTION

The following description is provided to enable a person skilled in the art to make and use the invention and sets forth the best modes contemplated by the inventor for carrying out his invention. Various modifications, however, will be readily apparent to those skilled in the art, since the generic principles of the present invention have been defined herein specifically to provide for an improved gas valve.

The object of this invention was to create a regulating gas valve that has an improved ability to provide fuel to gaseous operated burners in a such a manner as to provide a smooth and even gaseous fuel flow as possible between the high setting and low setting.

A further object of this invention to create a regulating gas valve that does not require an additional jet to be present in order to operate at the low setting.

The objects of this invention are achieved by having a main gas inlet of the valve body provide a hole in a valve plug with gas venting through the hole when the valve is positioned at the maximum flow setting. Adjacent to this hole in the valve plug is a linear canal. The linear canal is machined into the valve plug and positioned at a right angle to the center axis of the valve plug. The linear canal terminates along the circumference of the valve plug, where the gas valve is designed to provide its lowest setting. A hole, with a pre-determined and fixed diameter, is bored into the valve plug for the minimum flow setting at this location. Both the maximum flow settings and the minimum flow settings of the gas regulation valve are defined by this process, i.e. drilling a hole with a pre-determined fixed diameter into the plug. There is a fixed diameter hole for the maximum flow setting and a fixed diameter hole for the minimum flow setting.

A diagonally located channel is machined in the plug and is positioned around the axis of the plug. The diagonally located channel then discharges the gaseous fuel directly at the gas outlet. This diagonally located channel runs around the plug and is supplied with gas from the gas inlet of the valve body from the predetermined fixed diameter hole.

The further the plug is turned in the body from high setting to low setting, the more the channel located in front of the fixed predetermined diameter hole is masked. The chosen angle to machine the diagonally located regulating channel assures that, prior to achieving the low setting in the switching path, the channel is constricted completely and is therefore no longer supplied with gas.

The advantage of constructing the valve body (valve plug) in this matter is that the linearity of the regulation curve between the maximum flow setting and the minimum flow setting provides a finer adjustment of the gas flow, because of the method of restricting the gas supply hole in the regulation channel in the plug.

BRIEF DESCRIPTION OF THE DRAWINGS

The objects and features of the present invention, which are believed to be novel, are set forth with particularity in the claims. The present invention, both as to its organization and manner of operation, together with further objects and advantages, may be best understood by reference to the following description, taken in connection with the accompanying drawings, in which:

FIG. 2 shows an exploded view of the linear gas valve with the gas valve body and the gas valve plug.

DETAILED DESCRIPTION

Figure 1:
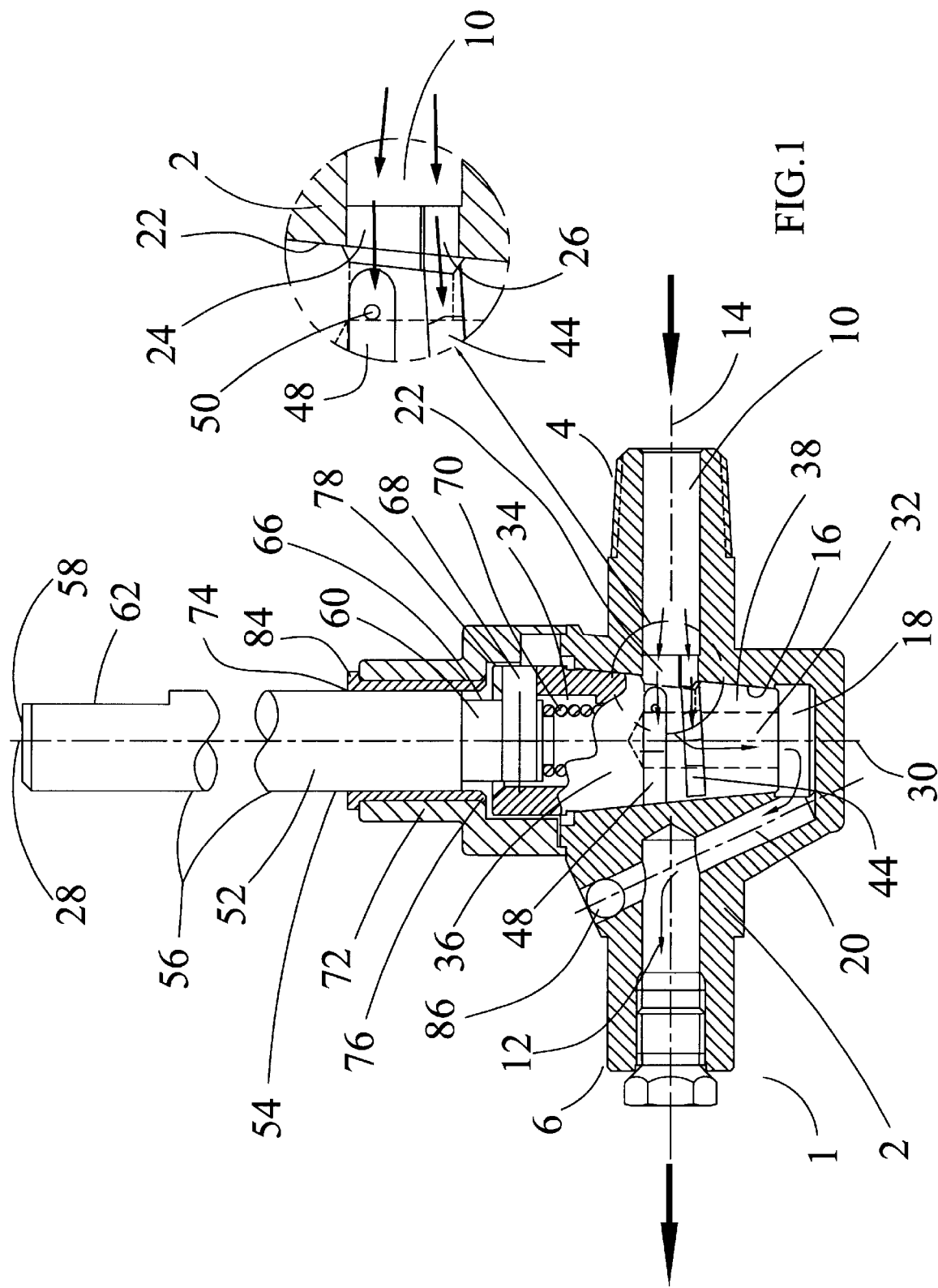
FIG. 1 shows a cross sectional view of the linear gas valve

A linearly regulated gas valve (1) comprises a gas valve body (2) which has a valve inlet (4) and a valve exit (6). The gas valve body (2) has a valve chamber (8) defined therein. The valve inlet (4) has an inlet conduit (10), the inlet conduit (10) communicating with the valve chamber (8) defined in the gas valve body (2). The valve exit (6) has an exit conduit (12) defined therein, and is attached to the gas valve body (2) and has a longitudinal axis (14) co-incident to the valve inlet (4). The valve chamber (8) has a bottom portion (16), the bottom portion of the valve chamber (8) having a groove (18) defined therein. The gas valve body (2) has a diagonal channel (20) machined therein and allows the exit conduit (12) defined in the valve exit (6) to communicate with the groove (18) defined in the bottom portion (16) of the valve chamber (8) defined in the gas valve body (2). A gas plug (86) is inserted into the diagonal channel (20) and prevents flammable gas from leaking out of the gas valve body (2), when the linearly regulated gas valve (1) is connected to a gas supply. The gas plug (86) can be spherical or cylindrical in shape, and is press fit into the diagonal channel (20). The inlet conduit (10) is separated from the valve chamber (8) by a partition (22). The partition (22) has a penetration, the penetration defined by a large hole (24) and a small hole (26) defined therein, allowing the inlet conduit to communicate with the valve chamber (8). The large hole (24) is positioned above the small hole (26).

A gas valve plug (28) has a shape complementary to the valve chamber (8) defined in the gas valve body (2). The gas valve plug (28) is generally cylindrical or conical in shape, having a second longitudinal axis (30) defined therein. The gas valve plug (28) has a lower chamber (32) that is generally cylindrical in shape defined therein. The lower chamber (32) penetrates approximately halfway through the gas valve plug (28). The gas valve plug (28) has an upper cavity (34) defined therein, and is separated from the lower chamber (32) by a partition (36) of solid material. The gas valve plug (28) has a first wall (38), the first wall (38) having a first slot (40) defined therein, the first slot (40) allowing a means to turn the gas valve plug (28), when the gas valve plug (28) is positioned in the gas valve body (2). The gas valve plug (28) has a first hole (42) defined therein, the first hole (42) being generally elliptical in shape and providing maximum flow through the valve inlet (4) into the lower chamber (32) of the gas valve plug (28). The gas valve plug (28) has a diagonal slot (44) defined therein, the diagonal slot (44) being located towards a bottom portion (46) of the first hole (42) and is machined at an angle to the second longitudinal axis (30) defined in the gas valve plug (28) and terminates approximately halfway around the circumference of the gas valve plug (28). The diagonal slot (44) communicates with the inlet conduit (10) through the small hole (26) defined in the partition (22) of the gas valve body (2). The gas valve plug (28) has a second channel (48), the second channel (48) being ninety (90) degrees to the second longitudinal axis (30) and is defined by a pair of angular cuts in the gas valve plug (28). The gas valve plug (28) further has a connecting hole (50) defined therein, the connecting hole (50) being located in said second channel (48). The second channel (48) and therefore the connecting hole (50) communicates with the inlet conduit (10) through the large hole (24) in the partition (22) of the gas valve body (2).

A control means (52) of a gas regulator (54) consists of a shaft (56), the shaft (56) having a top (58) and a bottom (60).

The top (58) of the shaft (56) has a "D" shaped portion (62) allowing for a standard knob means (not shown) to be attached thereto. The bottom (60) of the shaft (56) has a diameter (66) less than that of the shaft (56), and has an indexing rod (68) projecting outwards from the shaft (56). The shaft (56) is slip fit into the first slot (40) which is defined in the gas valve plug (28) and allows rotational movement of the gas valve plug (28) when installed into the gas valve body (2). A biasing means (70) or spring is located in the upper cavity (34) of the gas valve plug (28) and is biased against the control means (52).

A valve cap (72) having a central hole (74) defined therein allows the control means (52) to slip therethrough. A shoulder bushing (84) is press fit into the valve cap (72) and is staked to the valve cap (72) to prevent any unwanted motion of the shoulder bushing (84) relative to the valve cap (72). The shoulder bushing (84) can be made from any material that would be resistant to the corrosive effects of salt water, such as corrosion resistant steels, plastics, and other materials. Fabricating the shoulder bushing (84) from corrosion resistant materials will prevent the control means (52) from seizing within the valve cap (72). The valve cap (72) additionally has a circumferential groove (76) defined therein. The circumferential groove (76) being located coaxially with the central hole (74) and provides a surface (78) for the indexing rod (68) installed in the control means (52) to ride thereon. The spring (70) forces the indexing rod (68) on the control means (52) to bear against the circumferential groove (76) defined in the valve cap (72). The circumferential groove (76) additionally has an off position slot (80) which is used as a positive stop or detent, to position the control means (54) and therefore the gas valve plug (28) in an off position by allowing the indexing rod (68) to rest therein. At approximately ninety (90°) degrees rotation, the circumferential groove (76) in the valve cap (72) has a maximum position slot (82) defined therein, which is used as a positive stop or detent to position the control means (52) and therefore the gas valve plug (28) in the maximum flow position by also allowing the indexing rod (68) to rest therein, the first hole(42) communicating with said small hole(26) and said large hole (24) at the maximum flow position. Rotating the control means further causes the diagonal slot (44) in the gas valve plug (28) to be shadowed by the gas valve body (2) until about two hundred seventy (270°) degrees, when the diagonal slot (44) in the gas valve plug (28) is fully hidden by the gas valve body (2). The second channel (48) defined in the gas valve plug (28) communicates with the large hole (24) in the gas valve body (2) as it is rotated from the maximum position slot (82) to the two hundred seventy (270°) degree position where the minimum gas flow is attained. The gas valve cap (72) is attached to the gas valve body (2) using screws or bolts.

Figure 3A:
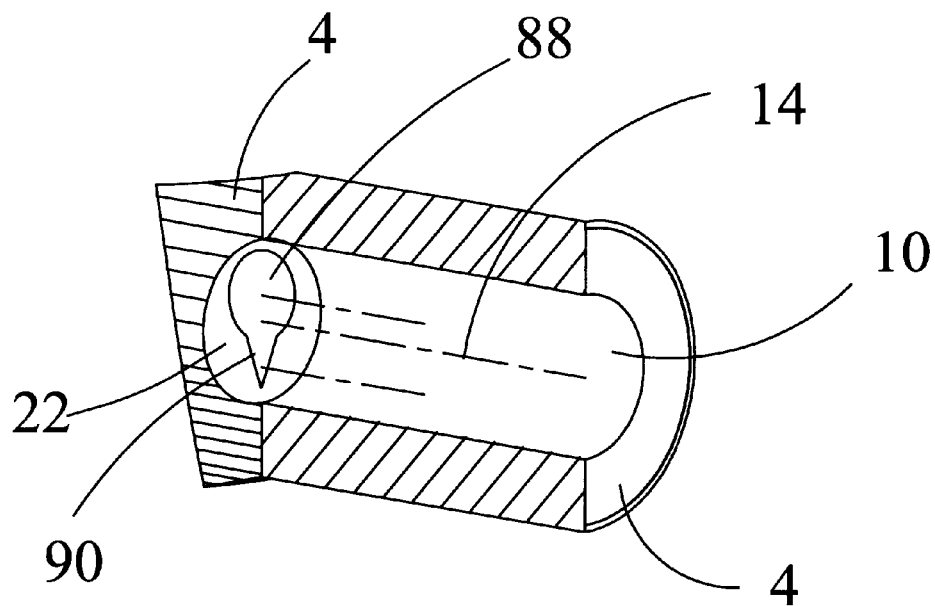
FIG. 3 shows an alternative pair of inlets for the gas valve

FIG. 3a shows an alternative embodiment of the penetrations in the partition (22). The penetration consists of an upper circular portion (88), and a lower conical shaped portion (90), where the upper circular portion (88) and the lower conical shaped portion (90) both allow the inlet conduit (10) to communicate with the valve chamber (8). The upper circular portion (88) communicates with the first hole (42) and the second channel (48) of the gas valve plug (28), while the lower conical shaped portion (90) communicates with the first hole (42) and the diagonal slot (44).

Figure 3B:
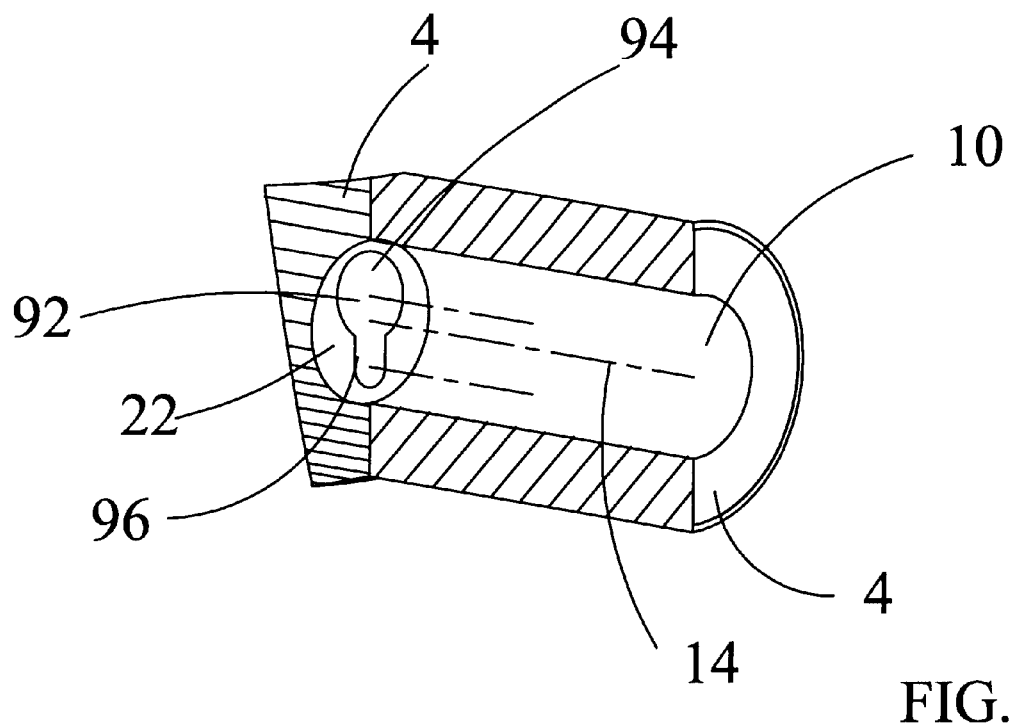
Figure 4:
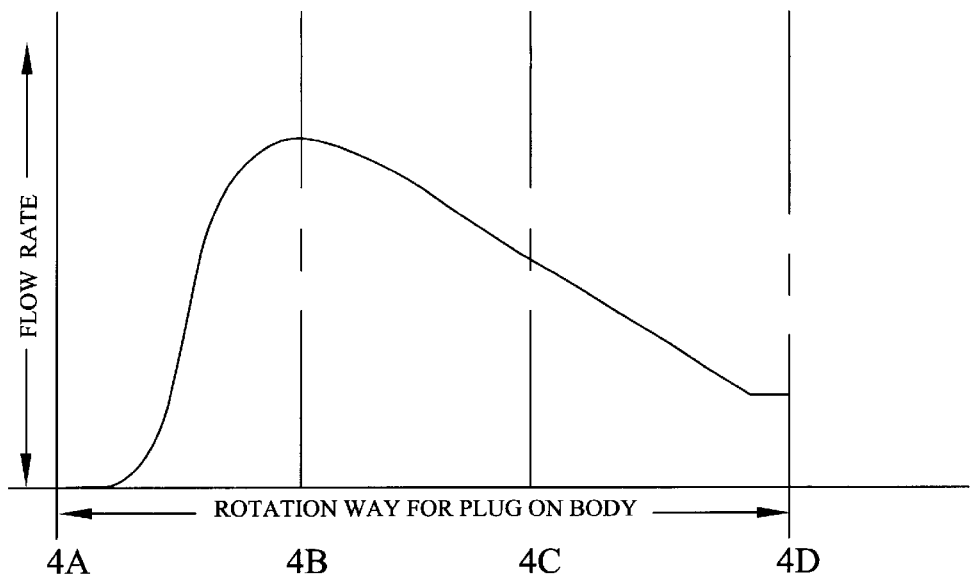
FIG. 4 shows a plot of the flow rate vs the rotation of the plug
Figure 4A:
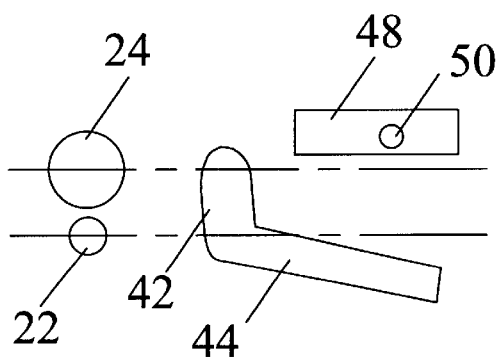
FIG. 4a shows no overlap between the gas inlet channel of the body and the slots of the plug. The gas valve is shown in closed position.
Figure 4B:
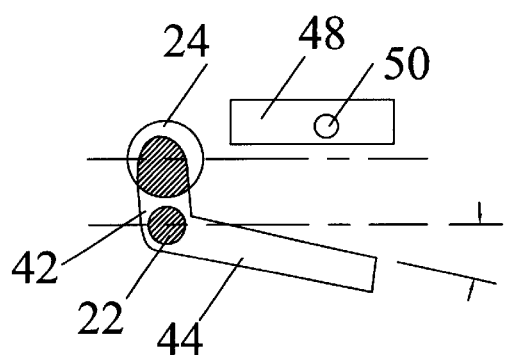
FIG. 4b shows the same channels as in FIG. 4a, but here the gas valve is switched to high position, in which case there is a complete overlap of the channels of the body with the long hole of the plug.
Figure 4C:
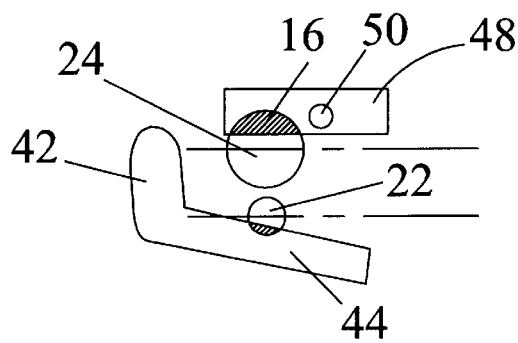
FIG. 4c shows the positions of the holes and channels in a gas valve switched to medium position.
Figure 4D:
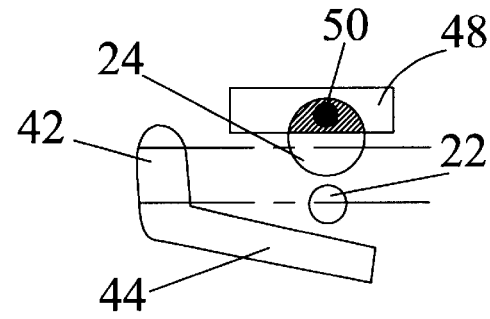
FIG. 4d shows the positions of the holes and channels in a gas valve switched to low position.
Figure 5:
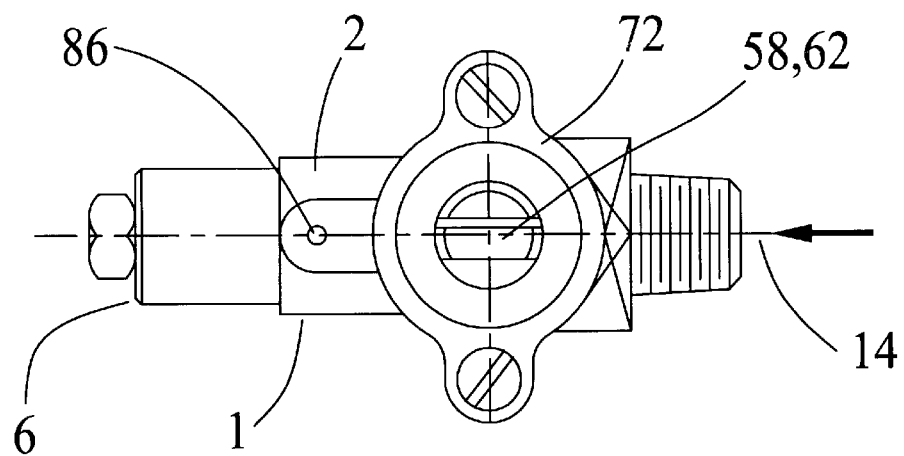
FIG. 5 shows a top view of the gas valve assembly
Figure 6:
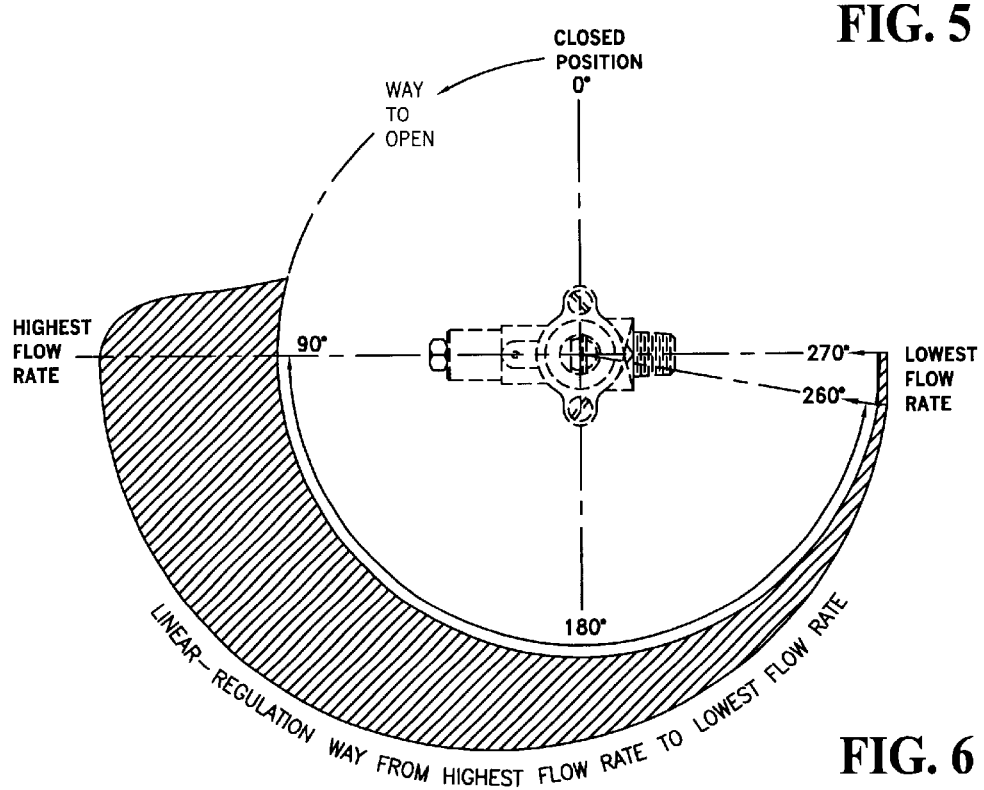
FIG. 6 shows a top view of the gas valve assembly depicting a graphical representation of the flow vs control position
Figure 7:
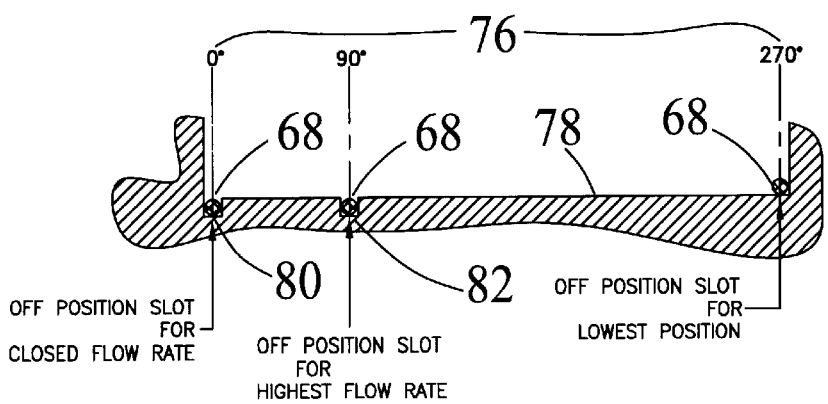
FIG. 7 shows an unwrapped view of the valve cap showing the bearing surface of the cap and the detent positions of the control valve.

FIG. 3b shows a second alternative embodiment of the penetrations in the partition (22). The penetration consists of a key-hole shaped penetration (92). The key-hole shaped penetration (92) consists of an upper circular hole (94) and a lower slot (96), where the lower slot (96) is smaller in width than the circular hole (94). The upper circular hole (94) and the lower slot (96) both allow the inlet conduit (10) to communicate with the valve chamber (8). The upper circular hole (94) communicates with the first hole (42) and the second channel (48) of the gas valve plug (28), while the lower slot (96) communicates with the first hole (42) and the diagonal slot (44) in the gas valve plug (28).

What is claimed is:

1. A linearly regulated gas valve, comprising:
   a) a gas valve body, said gas valve body having a gas valve chamber defined therein, a valve inlet, said valve inlet having a inlet conduit, said inlet conduit communicating with said gas valve chamber, a valve exit, said valve exit having an exit conduit, said inlet conduit and said exit conduit being aligned co-incident with a longitudinal axis, said gas valve chamber in said gas valve body having a bottom portion, said bottom portion having a groove defined therein, said gas valve body further having a diagonal channel defined therein allowing said gas valve chamber to communicate with said exit conduit, in said valve exit, said diagonal channel having means to prevent flammable gas from leaking from said gas valve body;
   b) said inlet conduit being separated from said valve chamber by a partition, said partition having a penetration defined therein, said penetration allowing said inlet conduit to communicate with said valve chamber;
   c) a gas valve plug, said gas valve plug having a second longitudinal axis defined therein, said gas valve plug having a shape complimentary to said gas valve chamber and having a lower chamber defined therein, said lower chamber penetrating halfway through said gas valve plug, said gas valve plug additionally having an upper cavity defined therein, said upper cavity being separated from said lower chamber by a partition, said upper cavity having a wall, said wall having a first slot defined therein, said slot allowing a control means to turn said gas valve plug when said gas valve plug is installed into said gas valve body;
   d) said gas valve plug having a first hole defined therein, said first hole allowing communication between said inlet conduit of said valve inlet and said lower chamber of said gas valve plug, said first hole providing maximum flow between said valve inlet and said gas valve plug, said gas valve plug having a diagonal slot defined therein, said diagonal slot being located towards said first hole and being defined at an angle to said second longitudinal axis of said gas valve plug, said diagonal slot communicating with said penetration in said partition in said gas valve body;
   e) said gas valve plug having a second channel defined therein, said second channel being ninety degrees to said second longitudinal axis, said gas valve plug having a connecting hole defined therein and positioned in said second channel, said second hole communicating with said penetration in said gas valve body;
   f) a valve cap, said valve cap having a central hole defined therethrough, a shoulder bushing being positioned within said central hole of said valve cap and being attached to said valve cap, a control means, said control means being inserted through said valve cap and therefore said shoulder bushing;
   g) said valve cap has a circumferential groove defined therein, said central groove being positioned co-axially with said central hole, said central groove providing a surface for means to control said gas valve to bear against;

h) said circumferential groove of said valve cap has an off position slot, and a maximum position slot defined therein; and i) a biasing means, said biasing means forcing said control means to bear against said groove in said valve cap.

2. The linearly regulated gas valve of claim 1, wherein;

a) said control means of said gas regulator consists of a shaft, said shaft having a top and a bottom, said top of said shaft having a D shaped portion, said D shaped portion allowing for a knob means to be attached thereon;

b) said bottom of said shaft having a diameter, said diameter being less than of the shaft to allow said bottom of said shaft to be positioned within said upper cavity of said gas valve plug, an indexing rod, said indexing rod projecting outwards from said shaft and being slip fit into said first slot of said gas valve plug to provide rotational movement of said gas valve plug; and c) said biasing means being located in said upper cavity, said biasing means being biased against said control means and forcing said indexing rod to bear against said groove in said valve cap.

3. The linearly regulated gas valve of claim 1, wherein;

a) said penetration consists of a large hole and a small hole, said large hole and said small hole being located in said partition of said gas valve body, said large hole being is located above said small hole;

b) said first hole and said diagonal slot of said gas valve plug communicates with said small hole in said gas valve body, said first hole also communicating with said large hole in said gas valve body;

c) said first hole of said gas valve plug communicating with said small hole and said large hole of said gas valve body in a maximum flow setting; and d) said second channel of said gas valve plug communicates with said large hole when said gas valve plug is turned from said maximum flow setting.

4. The linearly regulated gas valve of claim 1, wherein said penetration consists of an upper circular portion, and a lower conical shaped portion, said upper circular portion and said lower conical shaped portion both allow said inlet conduit to communicate with said valve chamber, said upper circular portion communicates with said first hole and said second channel of said gas valve plug, while said lower conical shaped portion of said penetration communicates with said first hole and said diagonal slot in said gas valve plug.

5. The linearly regulated gas valve of claim 1, wherein said penetration consists of a key-hole shaped penetration, said key-hole shaped penetration consists of an upper circular hole and a lower slot, said lower slot being smaller in width than the circular hole, said upper circular hole and said lower slot both allow said inlet conduit to communicate with said valve chamber, said upper circular hole communicates with said first hole and said second channel of said gas valve plug, said lower slot communicates with said first hole and said diagonal slot in said gas valve plug.

6. The linearly regulated gas valve of claim 1, wherein said shoulder bushing is made from corrosion resistant metal.

7. The linearly regulated gas valve of claim 1, wherein said shoulder bushing is made from plastic.

* * * * *